(12) United States Patent
Saravis

(10) Patent No.: US 6,557,955 B2
(45) Date of Patent: May 6, 2003

(54) SNAP TOGETHER MODULAR STORAGE

(76) Inventor: Darren Saravis, 2801 Junipero, Suite 210, Signal Hill, CA (US) 90806

( * ) Notice: Subject to any disclaimer, the term of this patent is extended or adjusted under 35 U.S.C. 154(b) by 20 days.

(21) Appl. No.: 09/759,898

(22) Filed: Jan. 13, 2001

(65) Prior Publication Data

US 2002/0093272 A1 Jul. 18, 2002

(51) Int. Cl.[7] ............................................. F16B 12/00
(52) U.S. Cl. ..................... 312/111; 312/108; 312/263; 403/381; 403/403
(58) Field of Search ................ 312/107, 108, 312/111, 109, 263, 265.5, 265.6; 403/381, 382, 403, 402; 52/581, 588.1, 589.1, 591.1, 592.1

(56) References Cited

U.S. PATENT DOCUMENTS

| 4,470,647 A | * | 9/1984 | Bishoff et al. | 312/108 X |
| 4,592,601 A | * | 6/1986 | Hlinsky et al. | 312/108 X |
| 4,652,170 A | * | 3/1987 | Lew | 403/381 |
| 5,466,058 A | * | 11/1995 | Chan | 312/263 X |
| 5,477,594 A | * | 12/1995 | LePage | 312/111 X |
| 5,502,939 A | | 4/1996 | Zadok | |
| 5,570,971 A | * | 11/1996 | Rixen et al. | 403/381 |
| 5,638,973 A | | 6/1997 | Dewey | |
| 5,888,114 A | * | 3/1999 | Slocum et al. | 52/591.1 X |
| 5,921,047 A | * | 7/1999 | Walker | 52/592.1 X |
| 5,921,646 A | * | 7/1999 | Hwang | 312/265.5 X |

FOREIGN PATENT DOCUMENTS

| EP | 333463 | * | 9/1989 | 312/263 |
| GB | 2030670 | * | 4/1980 | 312/263 |
| JP | 1-247682 | * | 10/1989 | 403/403 |
| WO | 93/19641 | * | 10/1993 | 312/108 |

* cited by examiner

Primary Examiner—Jose V. Chen
Assistant Examiner—Hanh V. Tran
(74) Attorney, Agent, or Firm—Sonnenschein, Nath & Rosenthal; Mark Krietzman

(57) ABSTRACT

An modular storage rack, display or cube system formed by snap together panels with alignment guides, which may also support wheels, shelves, drawers and doors. The system is assemble-in-place and may shipped and displayed for sale in a flat pack.

38 Claims, 17 Drawing Sheets

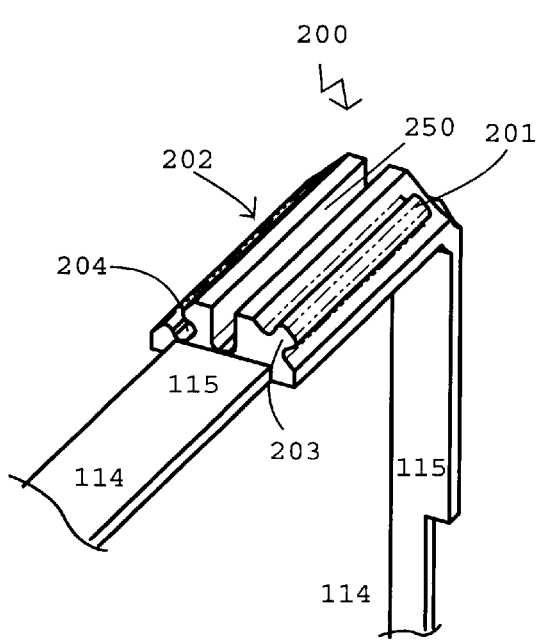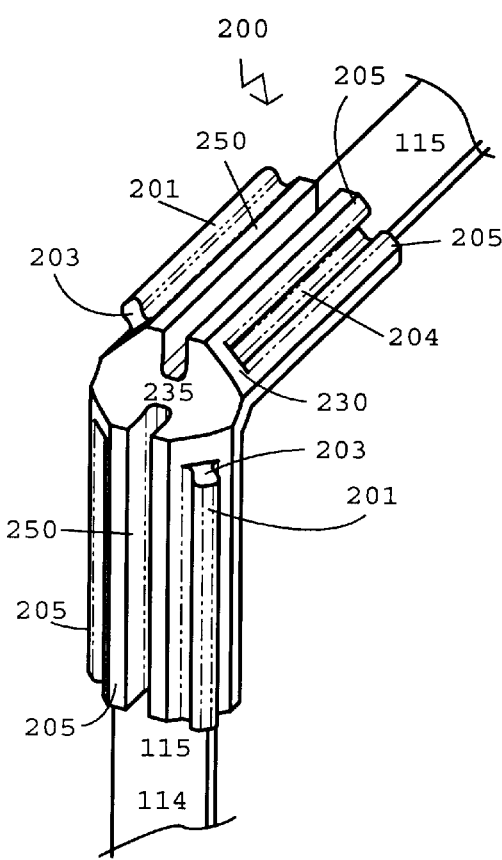
Fig. 2B
Fig. 2C

SNAP TOGETHER MODULAR STORAGE

BACKGROUND OF THE INVENTION

1. Field of the Invention

This present invention relates to a novel assemble-in-place storage system. More specifically, to a snap-together method and system of panels, with interlocking edges, from which a variety of self-supporting, storage units, racks, display centers and cabinets may be constructed.

2. Related Prior Art

Modular storage systems are useful to allow a user to customize a component system to fit his or her particular needs. Panel type storage whereby a similar side panels are connected via edge members are found in U.S. Pat. No. 5,638,973 issued to Dewey et. al, and U.S. Pat. No. 5,466,058 issued to Chan. In both Dewey and Chan the containers may be stacked by placing a tab-like projection on the bottom edge of one part into a grove-like indentation in the top of another.

U.S. Pat. No. 5,888,114 issued to Slocum et. al., teaches a toy assembly or modular storage system which has a self-supporting edge element to it. The Slocum storage system is a series of similar panels, which form cubes via a slide together extruded mating edge with a catch running down the periphery of one edge and a latch running down the other side. Once two panels are latched in the slide-together fashion, the panel edges can only be disassembled by sliding them apart. Slocum illustrates a plethora of configurations for the slide-in catch and corresponding slide-in latch, all relying on an extruded latch and catch which teaches no alignment guides or stops to maintain the plumb alignment of connected panels. Slocum's slide together mating system connects 4 panels to form a four wall box.

A remaining challenge in the field of modular storage systems is to provide similar panels which can snap together at the edges. An additional challenge is to form snap together 5 or 6 sided structures. The present invention overcomes such challenges and prior limitations by creating a snap-in latch and catch panel attachment.

SUMMARY OF INVENTION

The present invention is a modular storage system constructed of panels. Each panel has a front and a back side and four edges and four corners. On at least one side of each corner, viewed from a front or a back side is found a latch/catch pair. At each adjacent corner is formed another latch/catch pair, the sequence of latch to catch is alternating around each side and mirror on the opposite side. The catch is elongated and semi-rigid, having adequate elasticity, memory and/or lubricity to deform and snap-back into place upon insertion or removal of the corresponding elongated latch. Accordingly, a pair of oppositely oriented panels snap together at an edge forming a right angle between the two panels. Additional panels may be added to form structures such as racks, carts, desks and cubes. Each catch may also provide a stop to prevent the latch from sliding within the elongated catch and becoming misaligned. At the cornerbetween each adjacent pair of edges on each panel a buttress can be formed. Two adjacent corners buttresses (FIG. 1D) support each other and act as a larger cornersupport which further stabilizes the structures constructed from the panels (FIGS. 4 & 5A)

Although the preferred embodiment indicates the latch and catch edges are formed as part of each panel, affixing the latch and catch edges at the appropriate corner locations over a panel is also contemplated and set forth within. Advantages to affixing the latch and catch edges include combining dissimilar materials which are impossible or difficult to co-mold, such as a metal sheet, wood or metal grid panel (FIG. 8) affixed to plastic latches and catches. Doors and wheels (FIG. 5) may also be added to a cube, panel or structure. The panels may have protruding or recessed surface features which may form a support skeleton for a grid like panel (FIG. 2A, 114, 117 & 118) and may be used to provide pathways or guides for shelves and/or drawers.

The features of the invention believed to be novel are set forth with particularity in the appended claim. The invention itself, however, both as to configuration, and method of operation, and the advantages thereof, may be best understood by reference to the following descriptions taken in conjunction with the accompanying drawings.

BRIEF DESCRIPTION OF THE DRAWINGS

FIG. 2B is a front view of an unattached corner of one panel of the embodiment of FIG. 2A.

FIG. 2C is a rear view of an unattached corner of one panel of the embodiment of FIG. 2A.

PREFERRED EMBODIMENT OF THE INVENTION

Figure 1A:
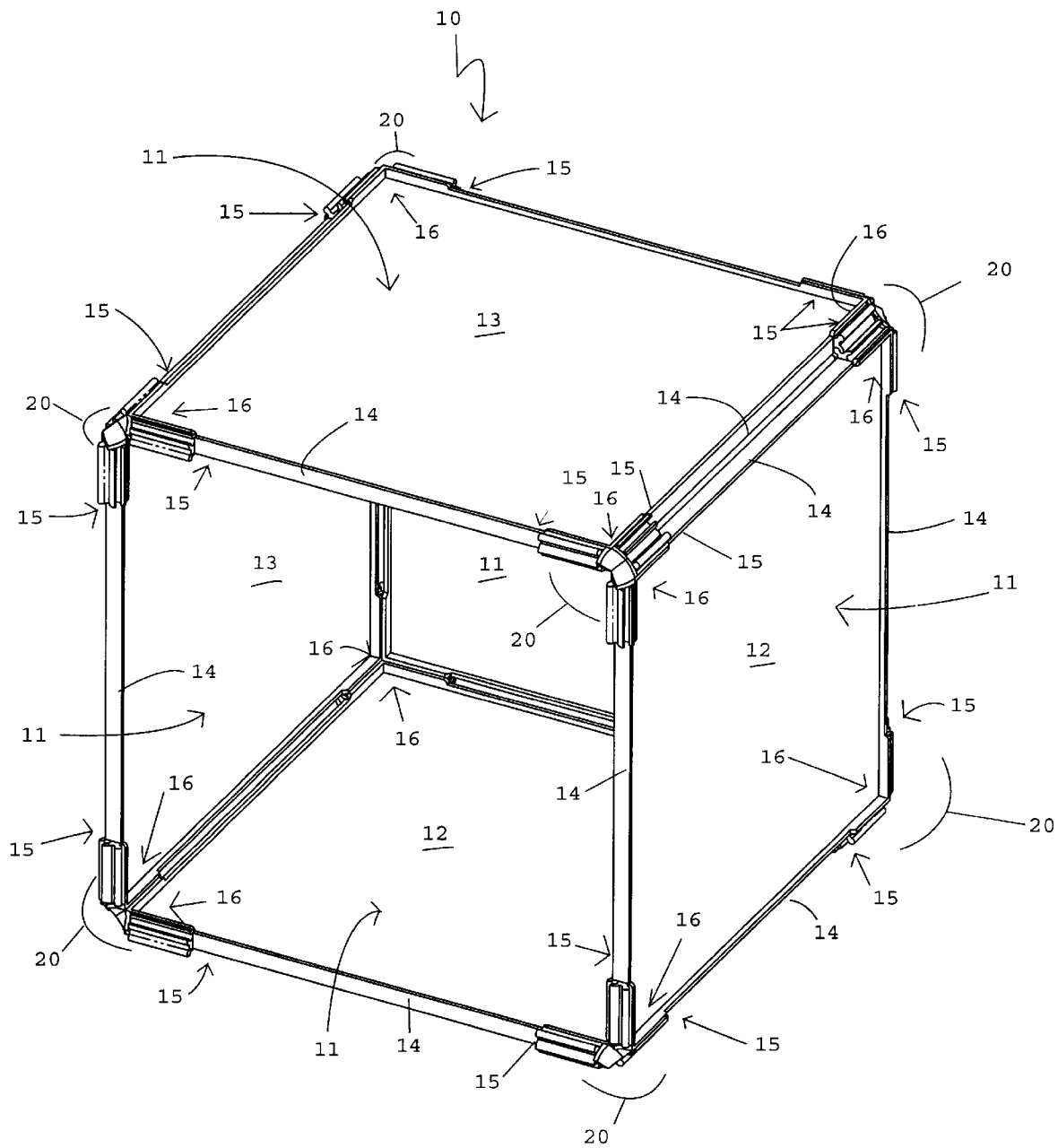
FIG. 1A is a front perspective view of the preferred embodiment of the modular storage system.

Shown in FIG. 1A is a front perspective view of the preferred embodiment, generally designated 10.

The cube is formed of five four sided panels 11. Each panel has a front 12 and a back side 13 face and an edge 14 at each side. At each end 15, of each edge 14, near the corners 16 of each panel 11, a latch/catch pair 20 is formed. Viewed from the edge 14, a latch 21 and a catch 22 are formed near the corner16. The latch/catch pairs 20 are reversed such that on any given edge 15 of a panel 11 one latch 21 will be exposed on one side and one catch 22 will be exposed on the other side. This configuration allows alternating panels to be used to construct the entire structure.

Figure 1B:
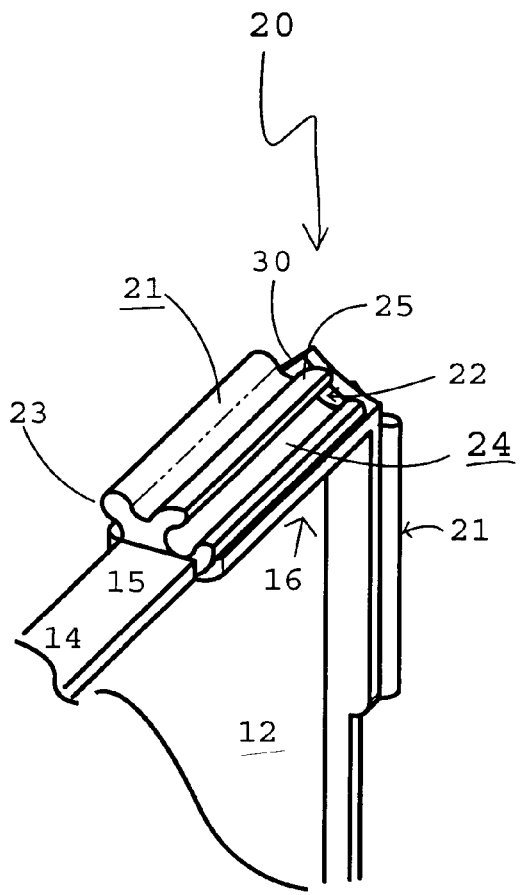
FIG. 1B is a front view of an unattached cornerof one panel of the preferred embodiment.
Figure 1C:
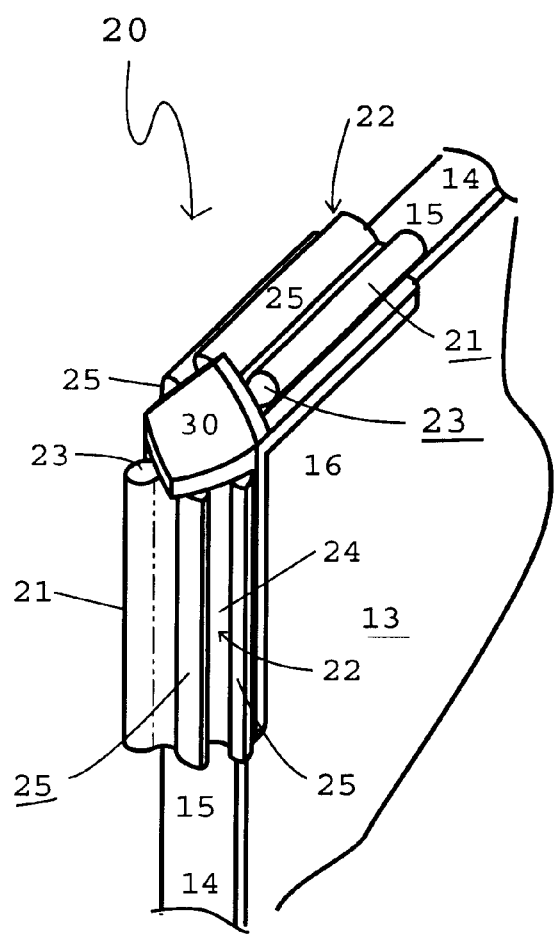
FIG. 1C is a rear view of an unattached corner of one panel of the preferred embodiment.
Figure 1D:
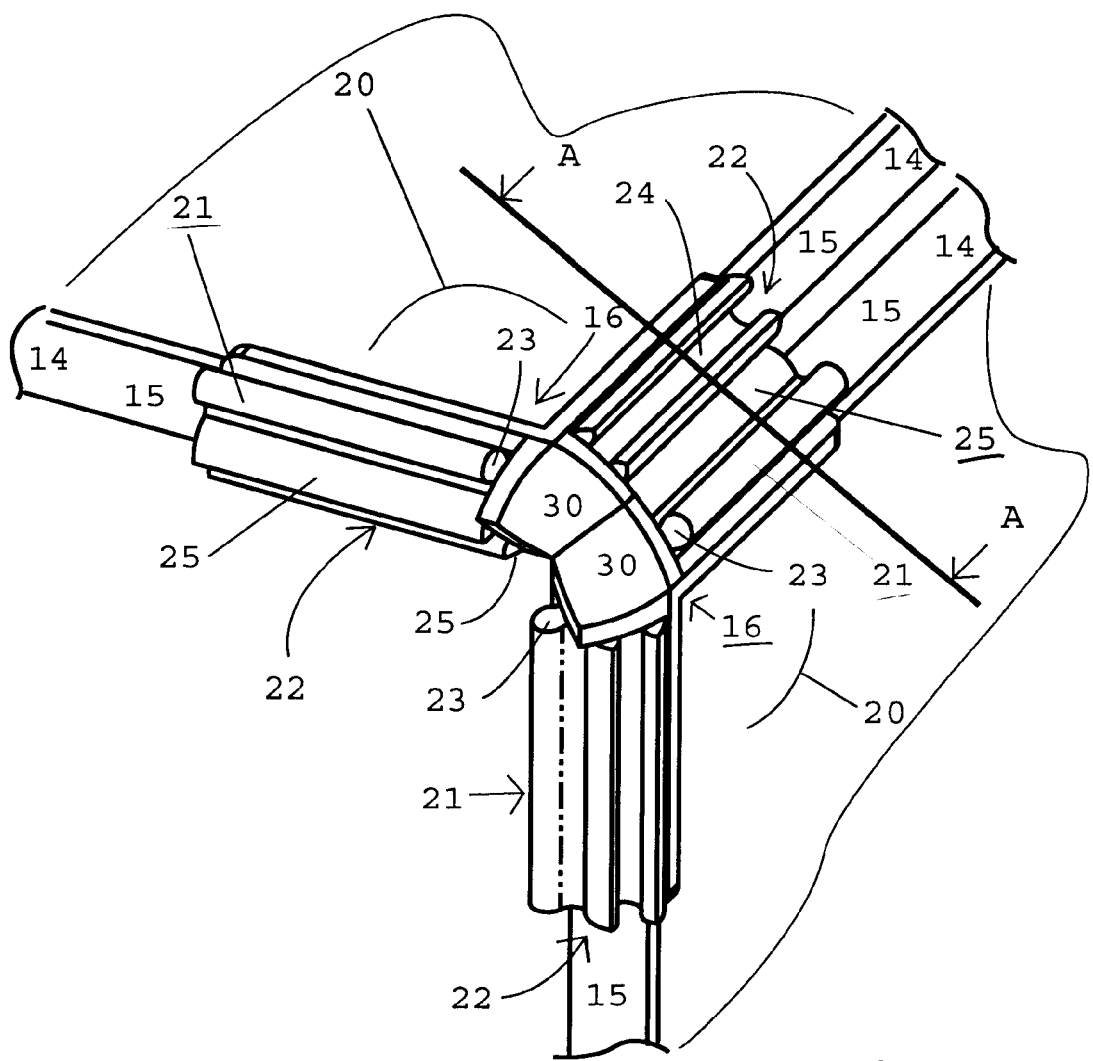
FIG. 1D is a perspective view of an attached front corner of the preferred embodiment.

Shown in FIGS. 1B, 1C, 1D and 1E, are front and rear perspective view of a corner of an unattached panel, a perspective view of an attached front corner and a cut away view of FIG. 1D at line A—A.

In FIGS. 1B & 1C the latches 21 shape is shown, the tab projection forming the latch is elongated with an enlarged head 23 at its distal end which reversibly snaps into the corresponding elongated catch 22 slot 24. The panels are preferably an injection molded part constructed out of acrylonitrile-butadiene-styrene "ABS", Acetal, Acylic or Nylon. However, depending on the intended use, materials such as polycarbonate, polypropylene or polyurethane may be substituted. An alignment stop 30 is formed at the junction of each edge 14. The alignment stop 30 prohibits the type of movement common to latch/catch panels which are connected via an extruded latch or catch which mount together via a slide in function. Additionally, as shown in FIG. 1D the alignment stops 30 form a buttress between panels enhancing the structural integrity of the structure.

Figure 1E:
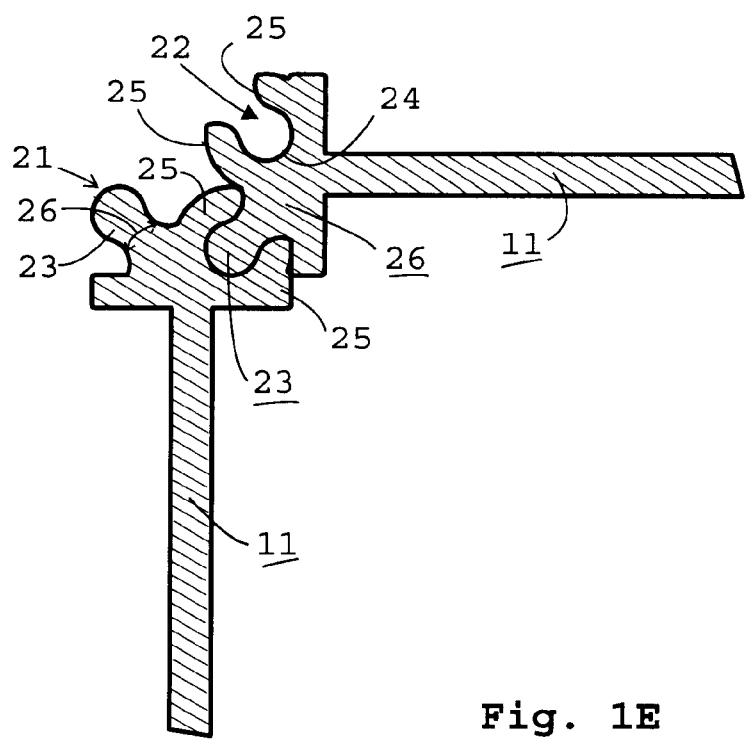
FIG. 1E is a cut-away side view along line A—A of FIG. 1D.

In FIG. 1E the enlarged head 23 forming the latch is shown mated firmly within the slot 24 of the catch 22, by constructing the catch 22 out of a material with sufficient lubricity, flexibility and/or memory, the enlarged head 23 may be withdrawn or snappedout of the slot 24 by displacing the slot walls 25 which can snap-back, undamaged, upon withdrawal. A sufficiently flexible slot wall 25 also places less stress on the neck 26 of the latch 21 thereby minimizing the risk of neck damage during attachment or detachment of panels.

Figure 2A:
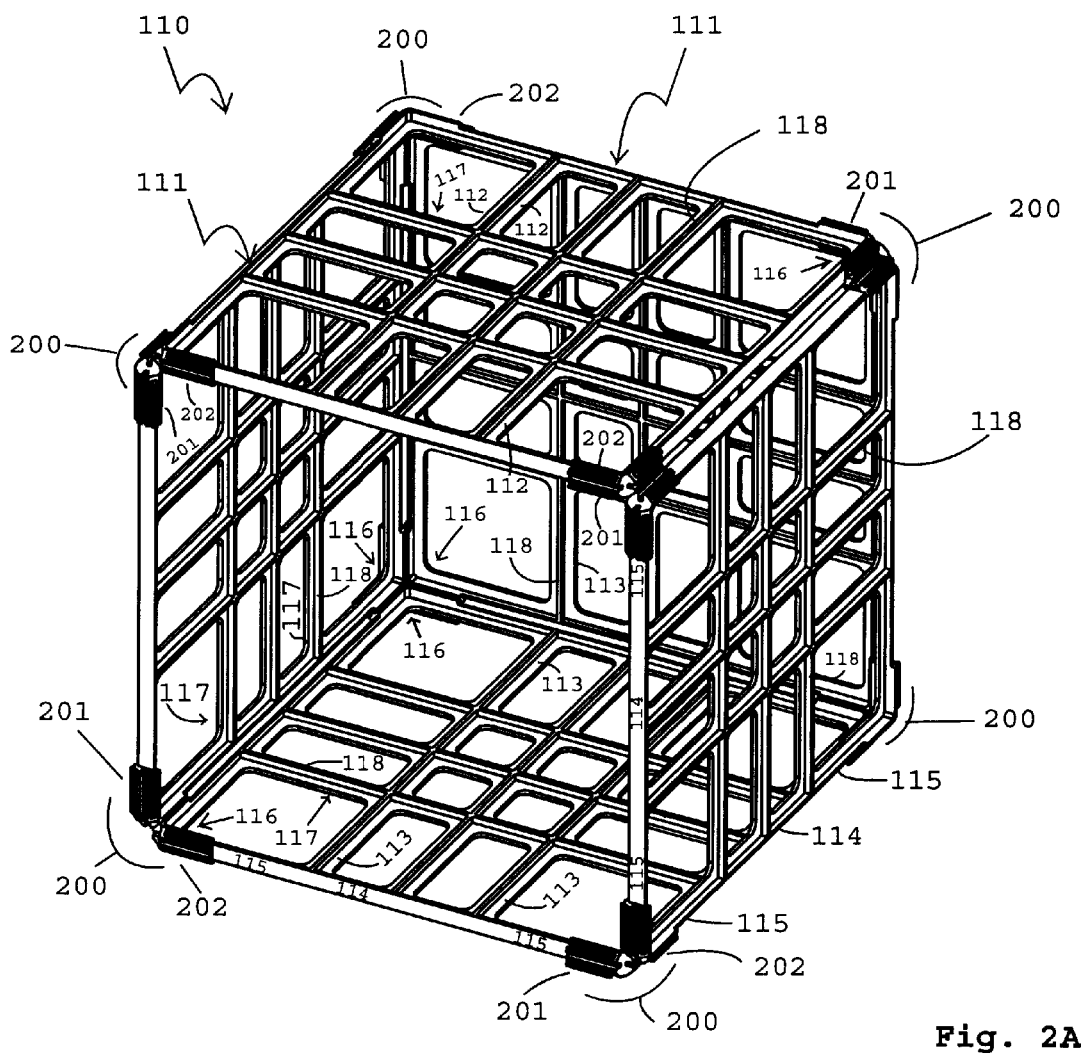
FIG. 2A is a front perspective view of a first alternate embodiment of the modular storage system.

Referring now to FIG. 2A there is illustrated a front perspective view of a first alternate embodiment of the modular storage system, generally designated 110.

The cube is formed of five square panels 111. Each panel 111 is a square frame with an open grid structure formed therein. Each panel has a front 112 and a back side 113 face and an edge 114 at each side. At each end 115, of each edge 114, near the corners 116 of each panel 111, a latch/catch pair 200 is formed. A panel grid 117 is formed within the boundary of the edges 114 and a raised grid support 118 may be extended from the panel grid to provide greater stability to the panel grid 117 and panel 111. Viewed from the edge 114, a latch 201 and a catch 202 are formed near the corner. The latch/catch pairs 200 are reversed such that on any given edge 114 of a panel 111 one latch 201 will be exposed on one side and one catch 202 will be exposed on the other side. This configuration allows similar alternating panels, with corresponding latch/catch pairs 200 to be used to construct the entire structure.

Variations in the side panels are anticipated and discussed within. Side panels may be constructed in a wide variety of forms, with different surface features, cut-outs, skeletal structures, protrusions and the like without departing form the intended scope of the invention.

In FIGS. 2B & 2C the latch 201 shape is illustrated, the tab projection forming the latch has a enlarged head 203 which snaps in a reversible fashion into the corresponding catch 202 slot 204. The panels are preferably an injection molded part constructed out of polypropylene, ABS, polycarbonate or nylon which provides flexibility and durability. An alignment stop 230 is formed at the junction of each edge 114. The alignment stop 230, adjacent to an angular corner buttress 235 prohibits forward and back movement of a latch 201 within a catch 202. Additionally, the combination of two or more adjacent corner buttresses 235 (FIG. 2D) forms a larger corner support further enhancing the structural integrity of the structure.

Figure 2D:
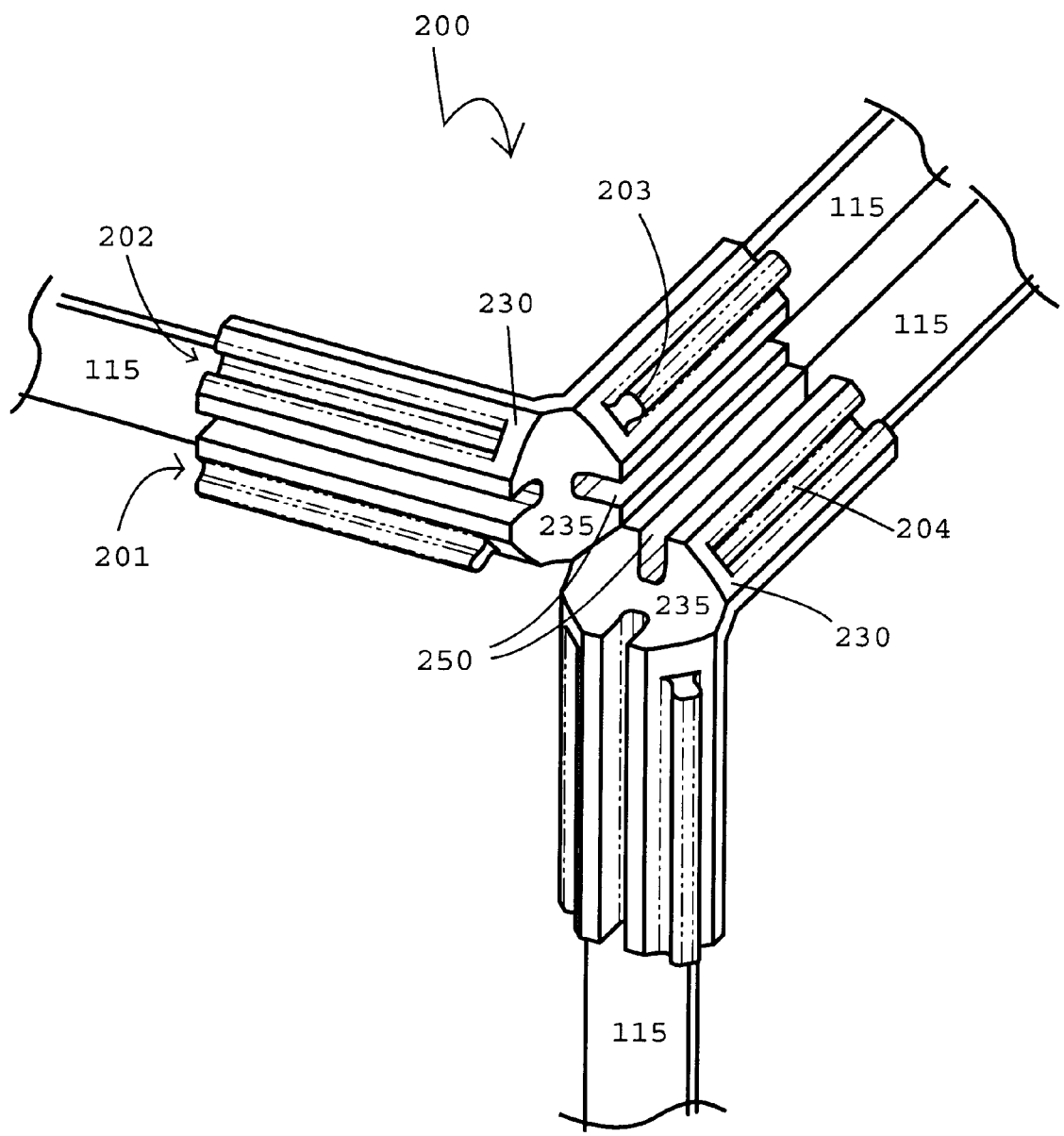
FIG. 2D is a blow-up of a front corner connection of the embodiment of FIG. 2A.
Figure 2E:
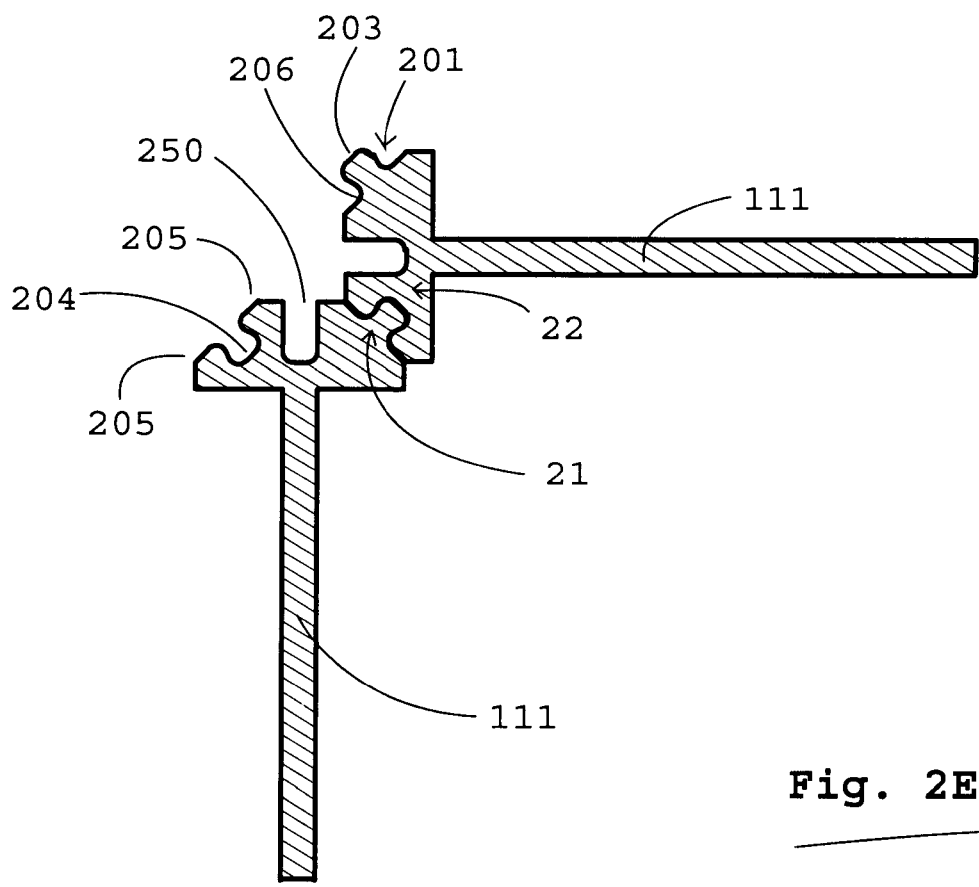
FIG. 2E is a cut-away side view along line A—A of FIG. 2C.
Figure 2F:
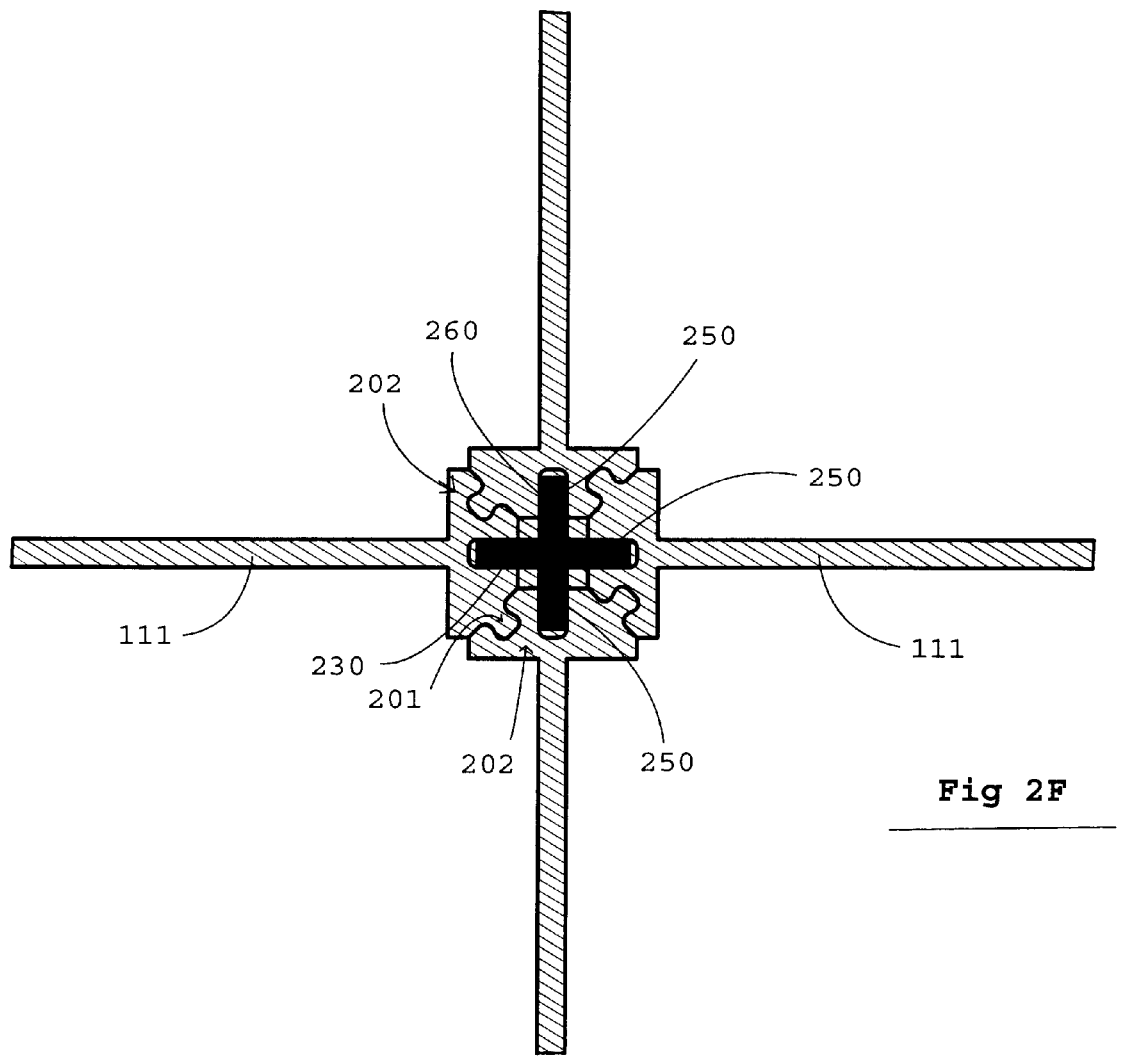
FIG. 2F is a cut-away edge view of the intersection of four cubes.

In FIG. 2D the enlarged head 203 forming the latch is shown mated firmly within the slot 204 forming the catch 202, by constructing the panels out of a material with sufficient flexibility, memory and/or lubricity the enlarged head 203 may be withdrawn or snapped-out of the slot 204 without damaging the slot walls 205 or the neck 206 of the latch 201. A support guide 250 is formed between the latch 201 and the catch 202. In FIG. 2F a support rod 260 of a size and shape to mate with the support guide 250 is shown. The support rod can be used to preclude removal of a panel when such action needs to be restricted, as may be the case with young children or in commercial, school or business locations.

Figure 3A:
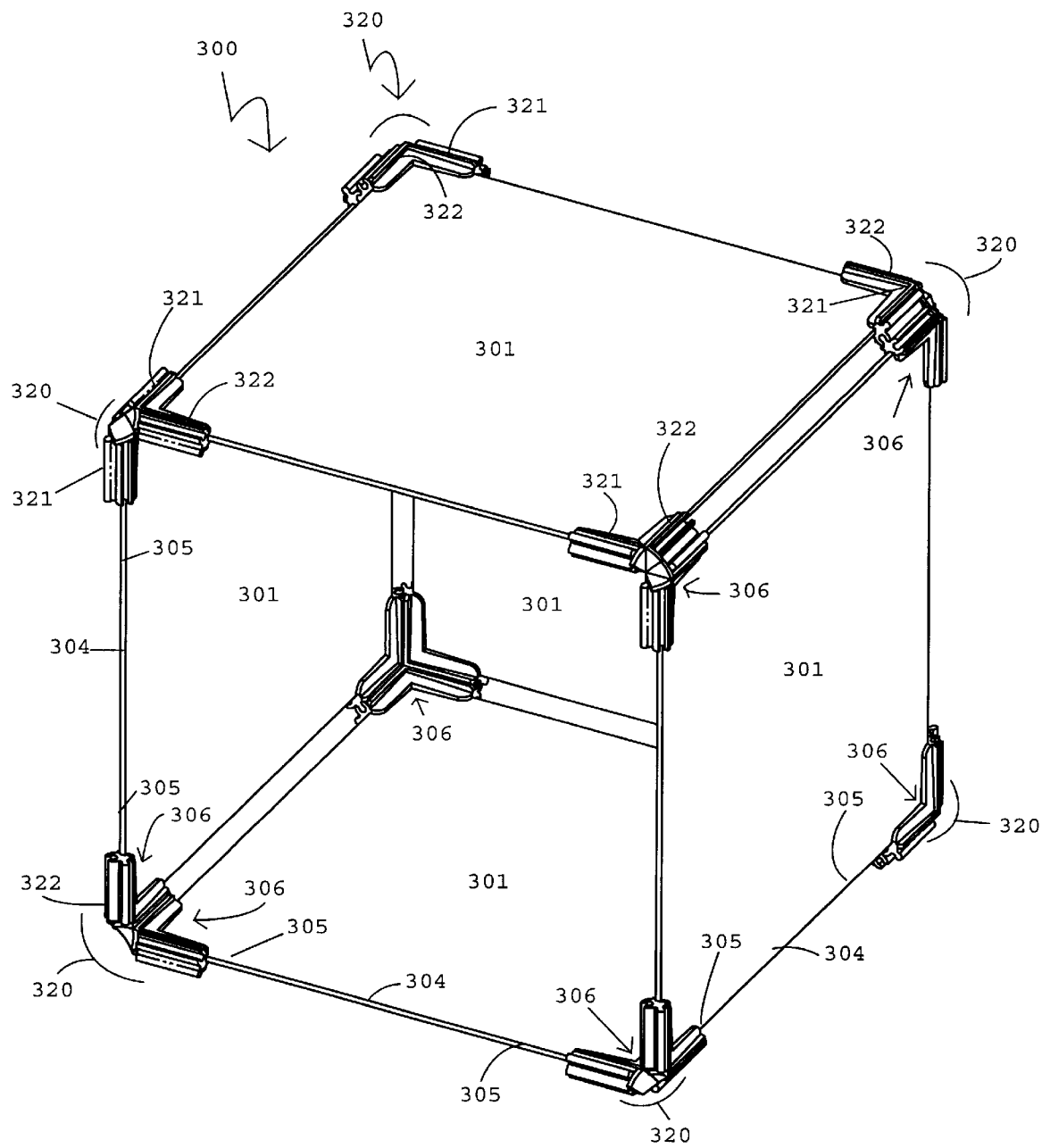
FIG. 3A is a front perspective view of a second alternate embodiment of the modular storage system.

FIG. 3A shows a front perspective view of a second alternate embodiment of the modular storage system, generally designated 300.

The cube is formed of five panels 301. Each panel 301 is of a similar size. Each panel side has an edge 304. At each end 305, of each edge 304, near the corners 306 of each panel 301, a latch/catch pair 320 is affixed. Viewed from the edge 304, a latch 321 and a catch 322 are attached near the corner306. The latch/catch pairs 320 are reversed such that on any given edge 304 of a panel 301 one latch 321 will be exposed on one side and one catch 322 will be exposed on the other side. This configuration allows alternating panels to be used to construct the entire structure.

Figure 3D:
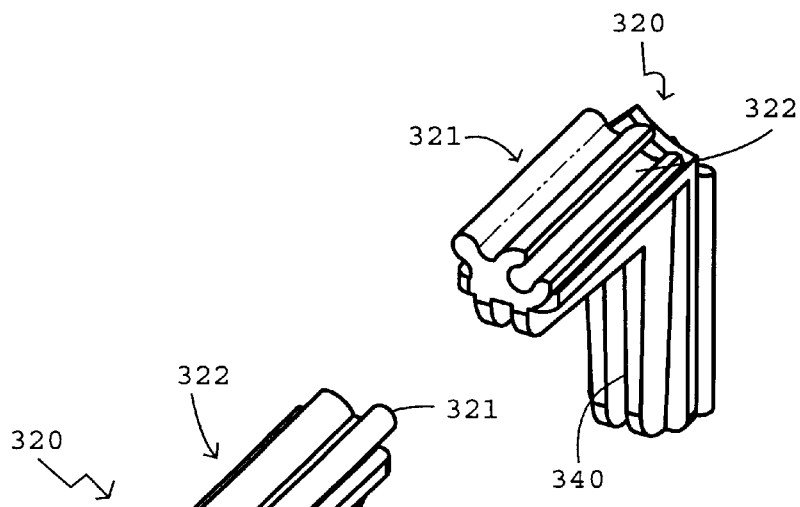
FIG. 3D is a blow-up rear perspective view of a, slide-on, corner latch/catch of the embodiment of FIG. 3A.
Figure 3C:
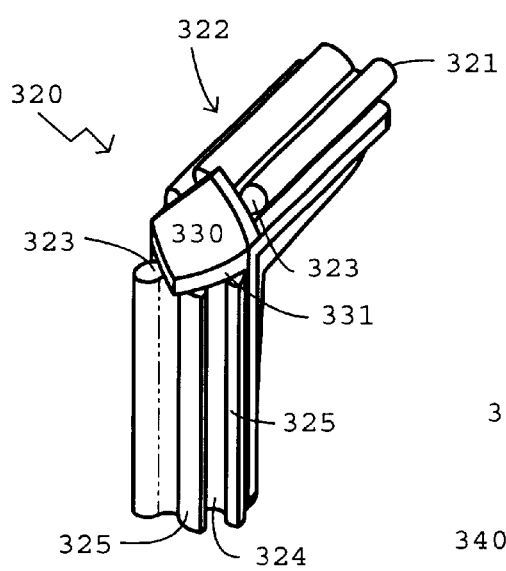
FIG. 3C is a blown-up front perspective view of a, slide-on, corner latch/catch of the embodiment of FIG. 3A.
Figure 3B:
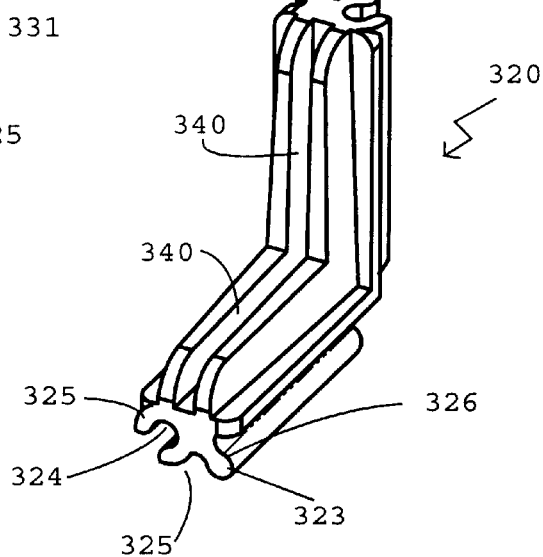
FIG. 3B is a blown-up back perspective view of a, slide-on, corner latch/catch of the embodiment of FIG. 3A.
Figure 3E:
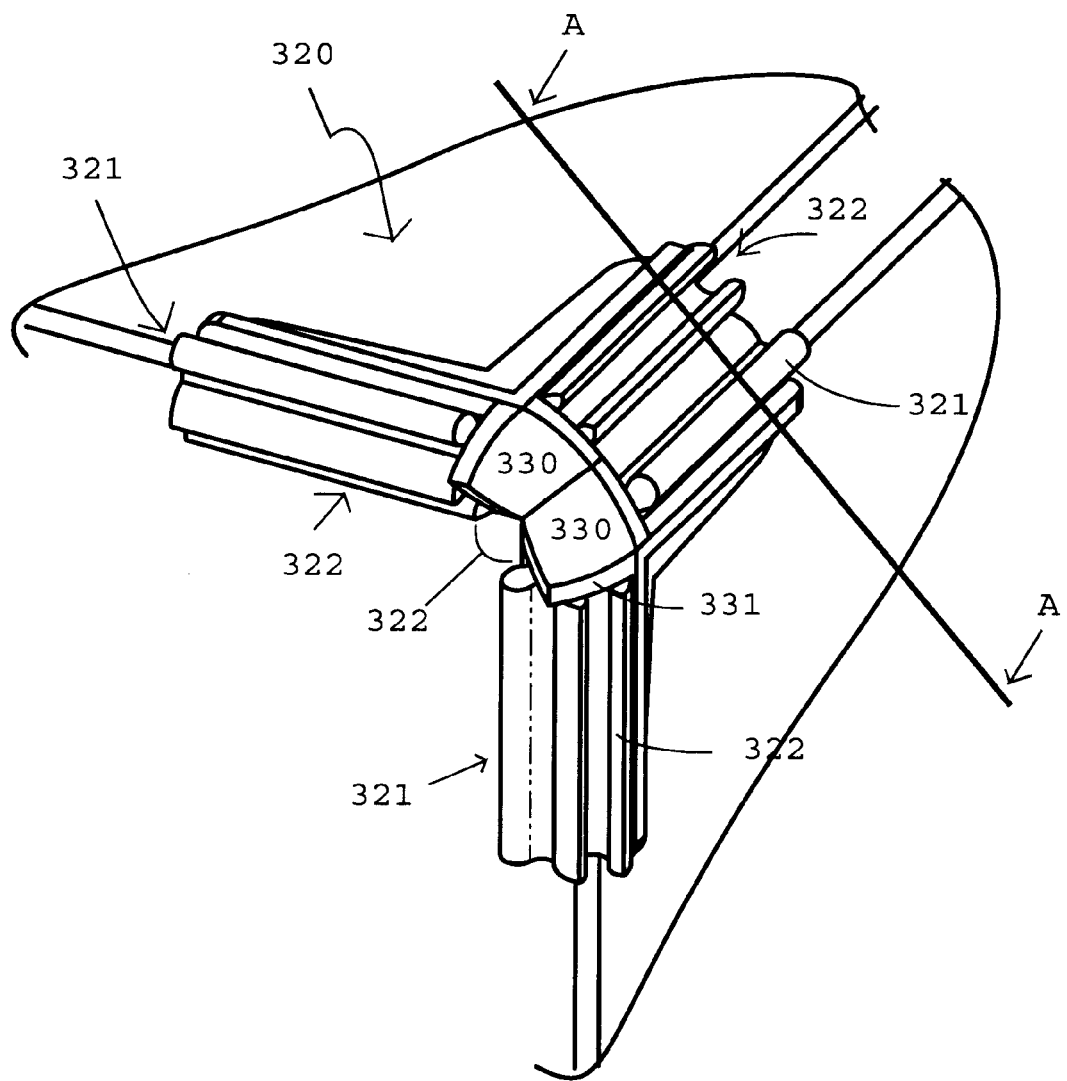
FIG. 3E is a blow-up of a front corner connection of the embodiment of FIG. 3A.

In FIGS. 3B, 3C, 3D, 3E and 3F, there is shown a front, back and rear perspective view of the slide-on corner catch/latch, a perspective view of an attached front corner, a cut away view of FIG. 3E at line A—A, and a cut-away edge view of the intersection of four cubes.

In FIGS. 3B, 3C, and 3D the latch 321 shape is illustrated, the tab projection forming the latch is elongated and has a enlarged head 323 which snaps in a reversible fashion into the corresponding catch 322 slot 324. The latch/catch pairs 320 are preferably an injection molded part constructed out of polypropylene, ABS, polycarbonate, high durometer rubber, or nylon which provides flexibility and durability. An alignment stop 330 is formed at the corner junction of each latch/catch pairs 320. FIG. 3E illustrates the position of the alignment stops 330 which inhibits movement of a latch 321 within a catch 322 thereby enhancing the structural integrity of the structure. Surrounding each corner buttress 330 is a support edge 331 which engages an adjacent support edge 331 of a panel affixed adjacent and forms the larger corner support 332. A panel mating guide 340 is formed opposite each latch/catch pair 320. It is via this panel mating guide 340 that each panel 301 is fitted into the latch/catch pair 320.

It is envisioned that each panel 301 will be solidly affixed to the panel mating guide 340. The nature of the attachment will be dependent on the material the panel is constructed of, adhesives, locking tabs, sonic welds, glue, rivets, crimping and the like may be used.

Variations in the side panels are anticipated and discussed within. A non-exclusive list of possible side panel materials are framed wire mesh, coated wire, plastic grids, wood, metal, plastic, composites, sheet steel (stainless, hot or cold rolled carbon steel, or any alloy), brass, or copper stamped or formed, woven metal or plastic and metal frames inserted molded into plastic.

Figure 3F:
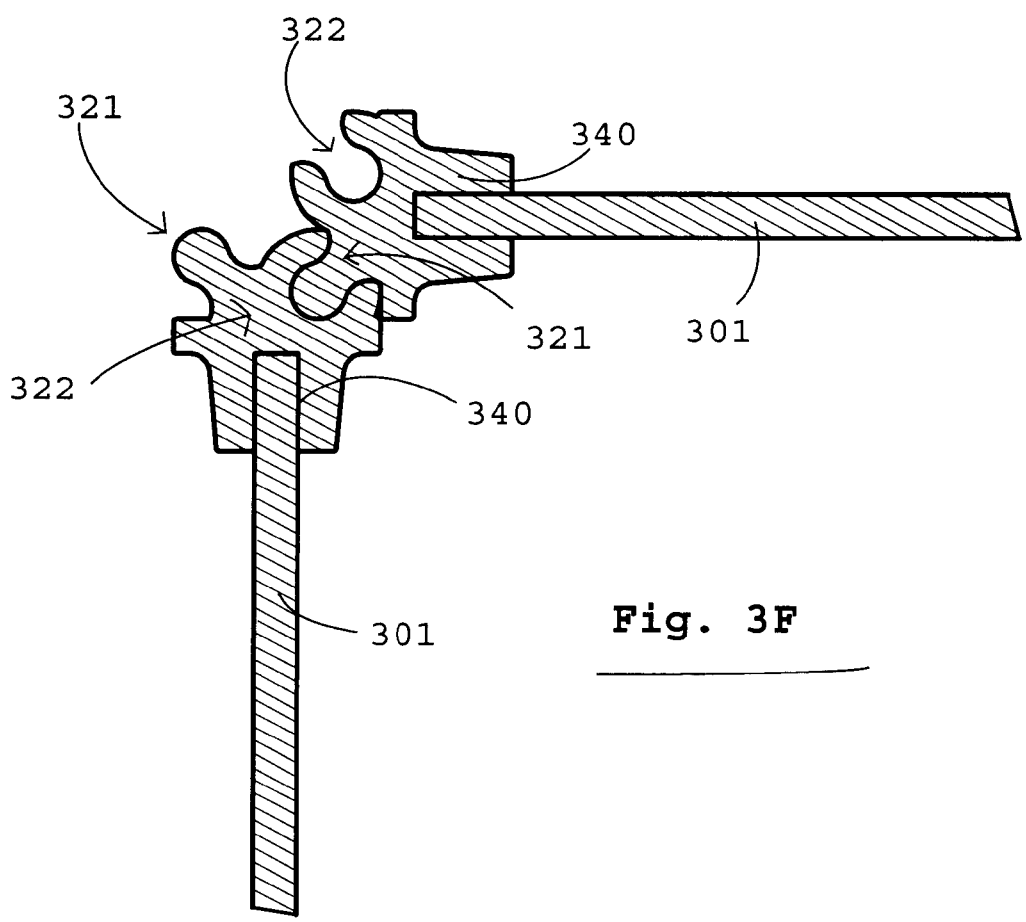
FIG. 3F is a cut-away side view along line A—A of FIG. 3E.

In FIG. 3F the enlarged head 323 forming the latch is shown mated firmly within the slot 324 forming the catch 322. By constructing the latch/catch pairs 320 out of a material with sufficient lubricity the enlarged head 323 may be withdrawn or snapped-out of the slot 324 without damaging the slot walls 325 or the neck 326 of the latch 321.

Figure 4:
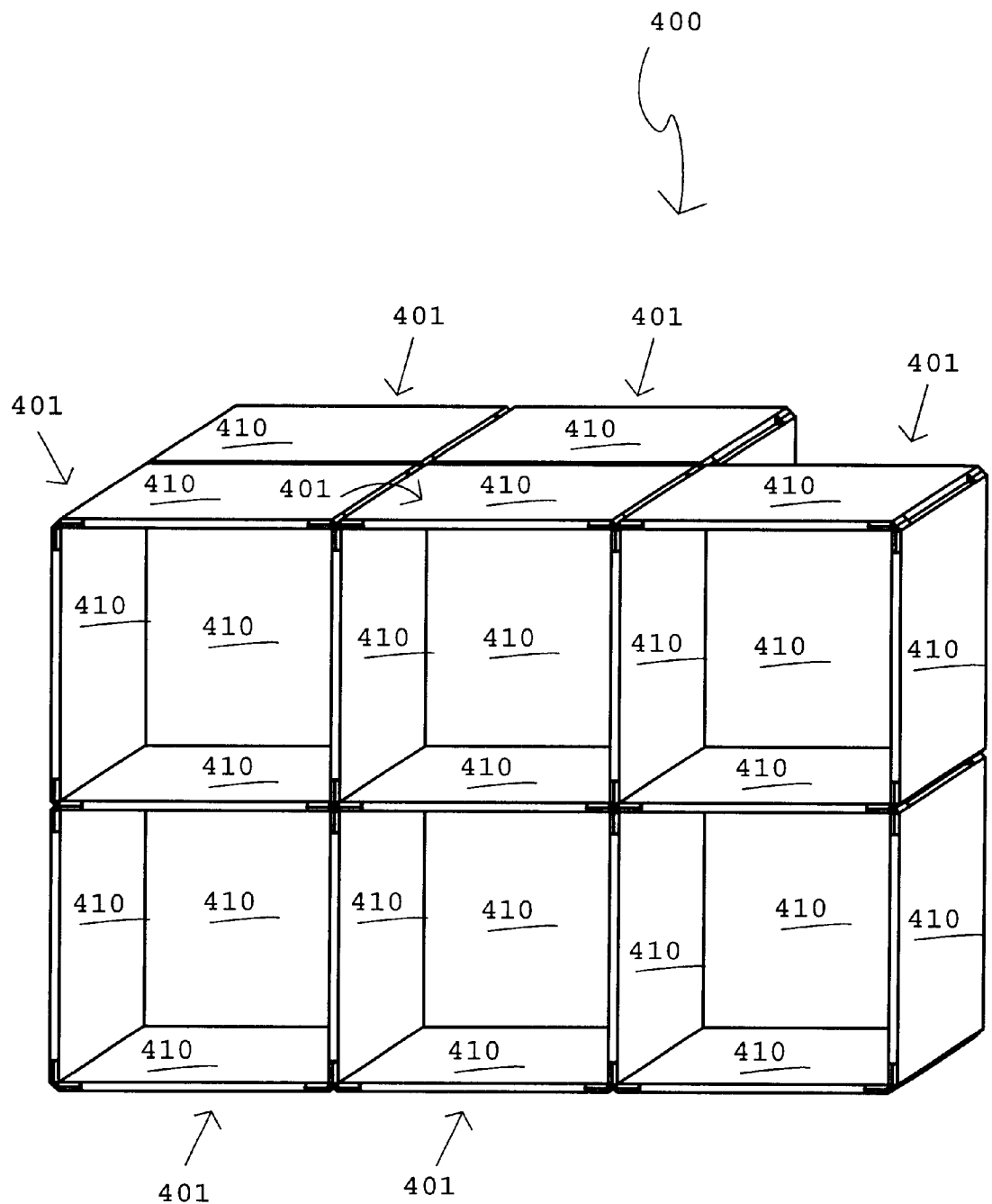
FIG. 4 is a perspective view of one arrangement of the connected panels.

Shown in FIG. 4 there is illustrated a perspective view of one arrangement of the connected panels, generally designated 400.

A series of cubes 401 are attached together with one panel 410 acting as a common panel shared between cubes 401. A latch/catch pair (as described in FIGS. 1–3) is found on opposite sides of each panel 410 to facilitate snap together construction of the cubes 401.

Figure 5:
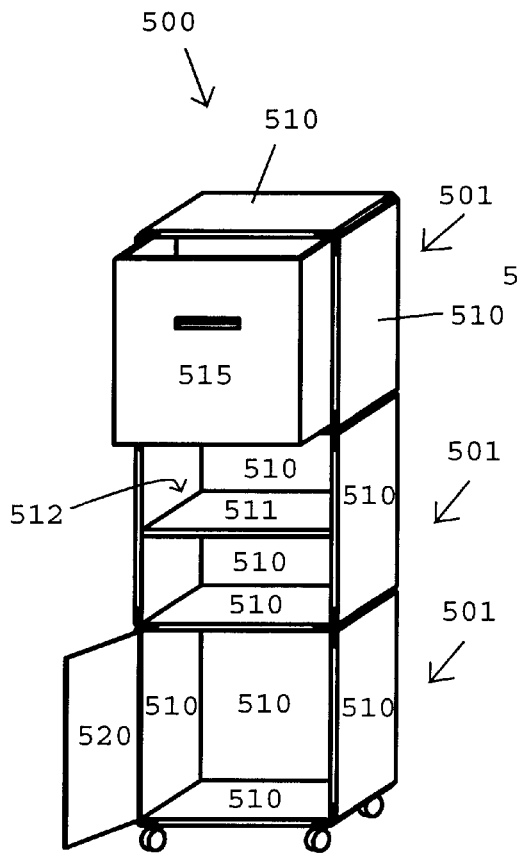
FIG. 5A is a perspective view of a second arrangement of the connected panels.
FIG. 5B is a component view showing the door and attachment to FIG. 5A.
FIG. 5C is a component view showing the wheel and attachment to FIG. 5A
Figure 5C:
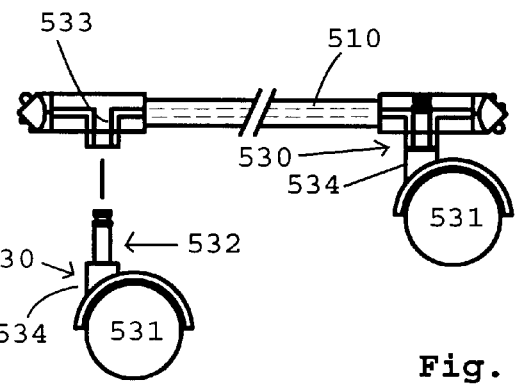
Figure 5:
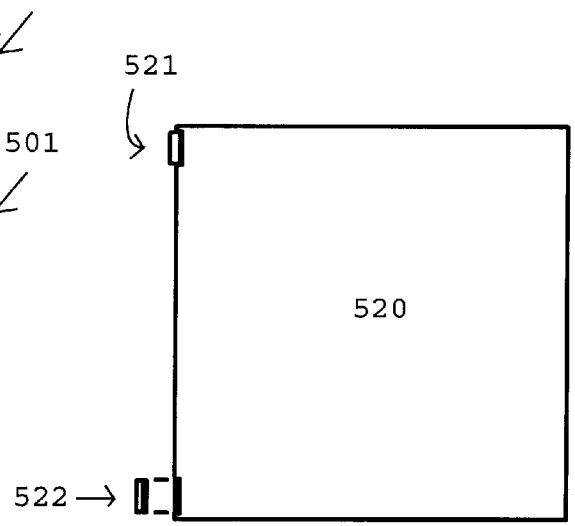

Shown in FIGS. 5A, 5B and 5C there is a perspective view of a second arrangement of the connected panels, generally designated 500 forming a vertical storage case with wheels (FIG. 5C) and a swing door (FIG. 5B).

A series of cubes 501 are attached together (as described in FIGS. 1–4) constructed out of identical panels 510 forming a tower. A shelf member 511 is held within a guide 512 formed as part of the surface feature of the panels 510.

A hinged door 520 attaches to one of the cubes 501 via a hinge which has on latch 521 and one catch 522 (as described in FIGS. 1–3). A group of removable caster-type wheel modules 530 are affixed one per bottom corner, to the tower 500. Each wheel module 530 has one wheel 531 and rod 532, which mates with a bose 533 formed in each corner of the bottom panel 510. Each rod 532 extends from a wheel stop 534 and mates with the bose 533.

Figure 6:
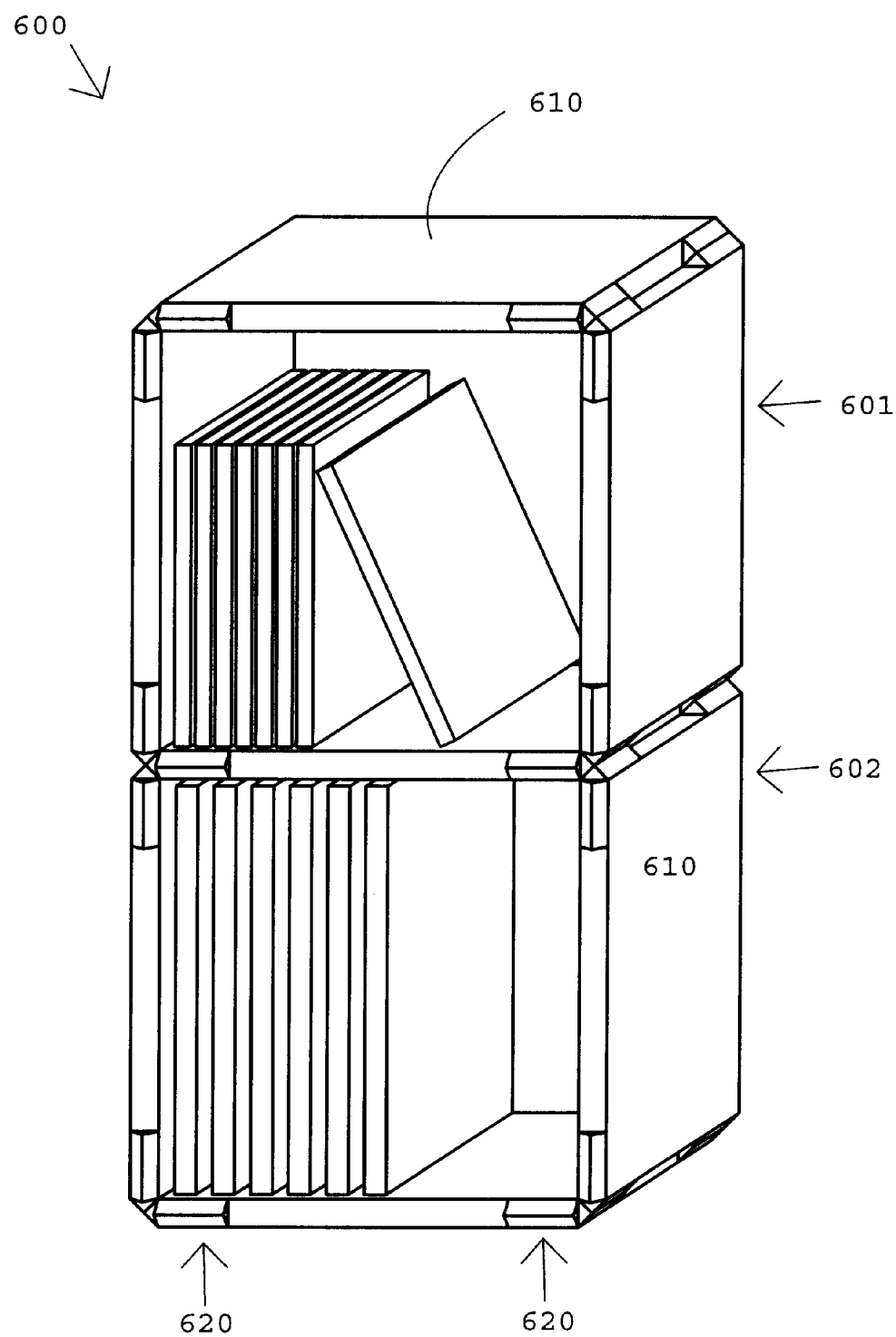
FIG. 6 is a perspective view of a third arrangement of the connected panels.

Shown in FIG. 6 there is a perspective view of a third arrangement of the connected panels, generally designated 600.

A series of cubes 601 are attached together (as described in FIGS. 1–4) constructed out of panels 610 forming a tower. In the configuration the cubes 601 are of a scale for desktop use to hold pads, paper, pens, clips, computer disks, CDs or other media storage devices. A series of rubber pads 620 may be affixed to the bottom surface of the lower cube 601 to inhibit slippage on a desktop.

Figure 7:
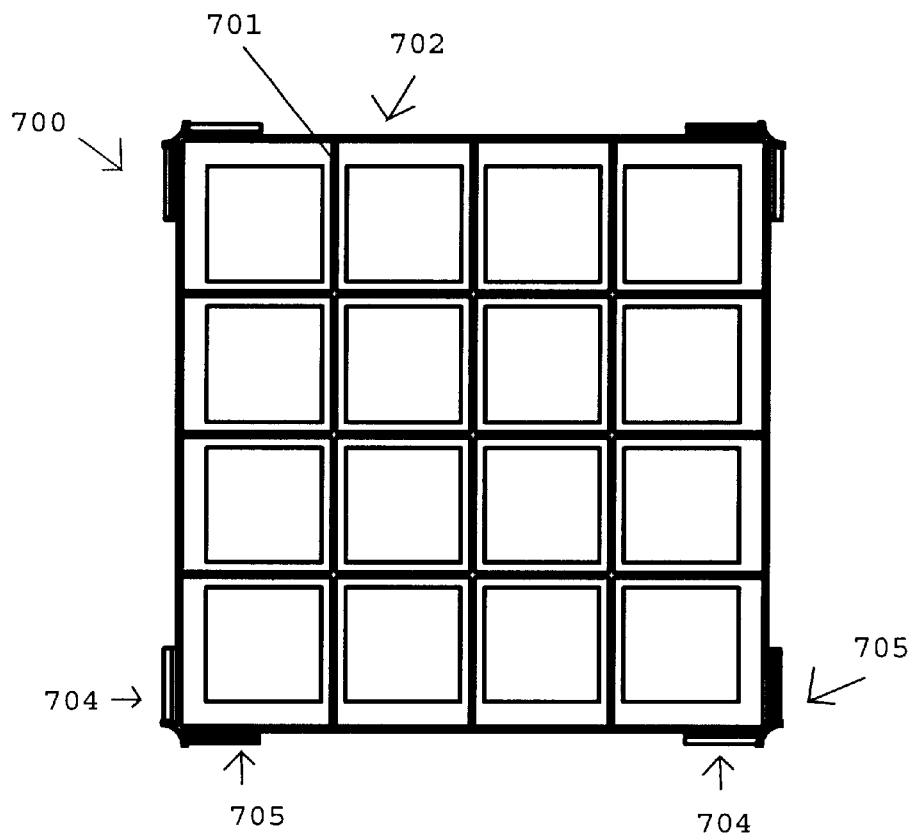
FIG. 7 is a front view of a first alternate panel embodiment.
Figure 8:
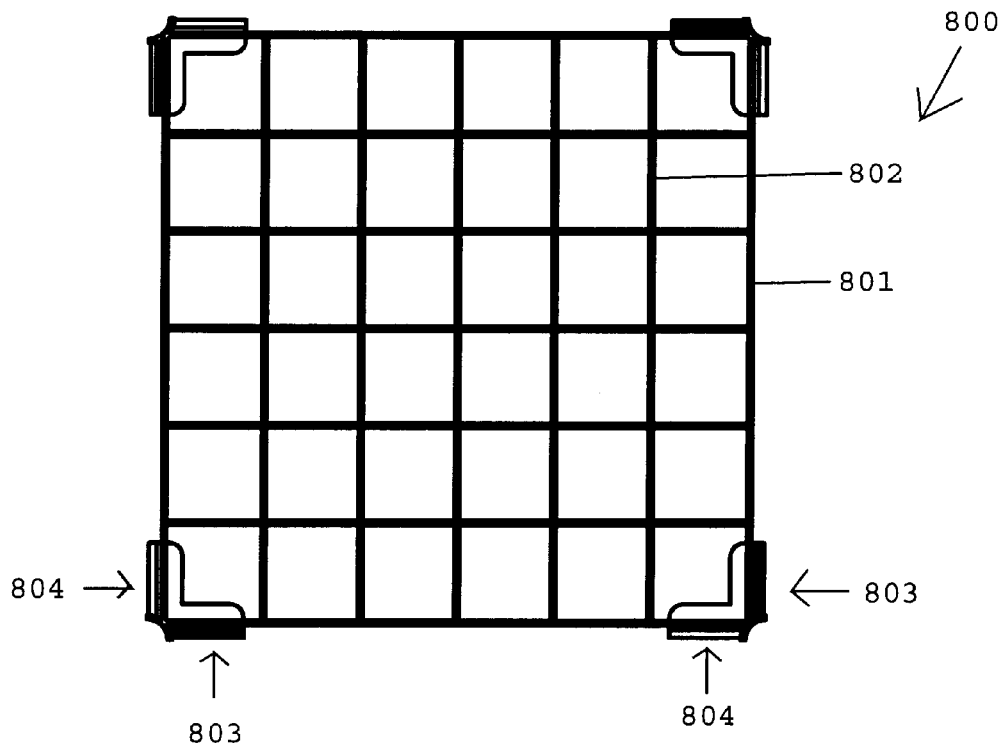
FIG. 8 is a front view of a second alternate panel embodiment.

Shown in FIGS. 7 & 8 there are front views of a first and second alternate panel embodiments generally designated 700 & 800 respectively.

In FIG. 7 there is a metal and plastic panel which has a wire insert 701 embedded within a preferably clear or translucent plastic structure 702, within a four sided square frame 703. On opposite ends of each side of the square frame 703 a latch 704 and a catch 705 (as previously described in FIGS. 1–3) are affixed, or formed as a part thereof. On the back face (not shown) of the panel 700 opposite each latch 704 is a catch 705 and opposite each catch 705 is a latch 704.

In FIG. 8 a square four sided frame 801 supports a central mesh 802 affixed at opposite ends of each side of the square frame 801 is a latch 803 and a catch 804 (as previously described in FIGS. 1–3). On the back face (not shown) of the panel 800 opposite each latch 803 is a catch 804 and opposite each catch 804 is a latch 803. The square frame 801 and/or the mesh 802 may be constructed of plastic, metal or metal coated with a rubber-like material, lacquered, painted or metal plated.

Since certain changes may be made in the above apparatus without departing from the scope of the invention herein involved, it is intended that all matter contained in the above description, as shown in the accompanying drawing, shall be interpreted in an illustrative, and not a limiting sense.

I claim:

1. A snap together construction system comprising:
   a plurality of interchangeable panels each with four edges, four corners, a front side and a back side;
   alternating plastic latches and catches, each catch with deformable slot walls and each latch with a projecting enlarged head extending near each corneron the front side of each panel to engage a corresponding latch of an interchangeable panel, whereby panels are attached when the enlarged head of one panel snaps into a catch of another panel by displacing the slot walls; and
   at least one alignment stop at each cornerto align the panels by prohibiting sliding movement of an attached panel along the length of the slot walls.

2. The system of claim 1 wherein each latch and catch extends at approximately a 45 degree angle from the panel.

3. The storage system of claim 1 wherein the panels are constructed from plastic and windows are formed within the panels creating a panel grid appearance, whereby one may view the inside a cube formed by a group of panels through a panel.

4. The system of claim 1 wherein one or more guides are formed on a panel whereby a shelf or drawer may be supported.

5. The system of claim 1 further comprising at least one alignment stop on each edge whereby movement of attached panels along the length of the slot walls is inhibited.

6. The system of claim 1 further comprising a corner buttress with a support edge, formed at each corner, whereby upon connection of any two panels the support edges of the adjacent cornerbuttresses contact each other and form a corner support.

7. The system of claim 1 further comprising:
   a plurality of wheels each connected to a mounting post;
   a wheel boss formed in each cornerof a panel adapted to engage a mounting post; and
   a stop extending from each post whereby the insertion of a post into a wheel boss is restricted.

8. The storage system of claim 6 wherein each corner buttress is roughly a concave diamond shaped.

9. The system of claim 1 further comprising:
   a door;
   at least two hinges affixed on one side to said door; and,
   an alternating latch or catch extending from each hinge to engage a corresponding latch or catch on the back side of a panel.

10. The storage system of claim 1 wherein the panels are formed of a plastic-like material selected from the group consisting of, acrylonitrile-butadiene-styrene "ABS", Acetal, Acylic, Nylon, polycarbonate, polypropylene, or polyurethane.

11. The system of claim 3 further comprising a raised grid support formed along the grid.

12. A snap together construction system comprising:

a plurality of interchangeable panels each with four edges, four corners, a front side and a back side;

a plastic corner cover mounted over each of the cornerof each panel, with alternating latches and catches supported thereon extending towards the front side of each panel, each catch with a deformable slot wall and each latch with a projecting enlarged head, whereby panels are attached when the enlarged head of a latch on panel snaps into a catch of another panel by displacing the slot walls; and, at least one alignment stop formed as part of each cornerto align the panels by inhibiting sliding movement along the length of the slot walls.

13. The storage system of claim 12 wherein each latch and catch cornercover is permanently affixed to said panel's corners.

14. The storage system of claim 12 wherein the cornercovers and panels are constructed of dissimilar materials.

15. A snap together storage system comprising:

a plurality of substantially square interchangeable plastic panels each with four edges, four corners, a front side and a back side;

alternating plastic latches and catches, each catch with deformable slot walls and each latch with a projecting enlarged head formed near the corners on the front side of each panel, whereby an enlarged head on one panel can snap into a catch of another panel by displacing the slot walls;

at least one alignment stop formed substantially at each corner, whereby sliding movement of attached panels along the length of the slot walls is inhibited; and a corner buttress with a support edge formed at each corner, whereby connection of any two or more panels places the support edges of adjacent cornerbuttresses in contact with each other to form a larger corner support.

16. The storage system of claim 15 wherein one or more guides are formed on a panel whereby a shelf or drawer may be supported.

17. The storage system of claim 15 further comprising:

a plurality of wheels each connected to a mounting post;

a wheel boss formed in each corner of a panel adapted to engage a mounting post; and a stop extending from each post whereby the insertion of a post into a wheel boss is restricted.

18. The storage system of claim 15 further comprising:

a door;

at least two hinges affixed on one side to said door; and, an alternating latch or catch extending from each hinge to engage a corresponding latch and/or catch on the back side of a panel.

19. A method of constructing a snap together storage box comprising the steps of:

snapping the latches and catches of a first side panel, with alternating latches and catches extending from its edges, into the latches or catches of an intechangeable second side panel;

snapping the latches and catches of a third interchangeable side panel, with alternating latches and catches extending from its edges, into the latches or catches of an intechangeable second side panel opposite the first panel;

snapping the latches and catches of a fourth interchangeable side panel, with alternating latches and catches extending from its edges, into the latches or catches of the third and the first side panels forming a box open at the top and bottom and adding a bottom or top to the box by snapping the latches and catches of a fifth interchangeable side panel with alternating latches and catches extending from its edges into the latches and catches of the first, second, third and fourth side panels.

20. The system of claim 1 further comprising plastic latches formed on the back side of at last two panels opposite each frontside catch and plastic catches formed on the back side of each panel opposite each frontside latch.

21. The system of claim 12 further comprising backside facing latches opposite each frontside catch and backside facing catches opposite each frontside latch.

22. The storage system of claim 15 further comprising alternating plastic latches and catches formed near the corners on the back side of each panel, each extending from said back side, each latch positioned opposite a front side catch and each catch positioned opposite a front side latch.

23. The method of claim 19 the method further comprising providing alternating latches and catches on both the front and back sides of each corner, wherein each backside latch extends opposite a front side catch and each backside catch extends opposite a front side latch.

24. The system of claim 12 further comprising a corner buttress with a support edge formed at each corner, whereby upon connection of any two panels the support edges of the adjacent corner buttresses contact each other and form a cornersupport.

25. The system of claim 1 further comprising on the back side of at least one panel a plastic catch formed opposite each latch and a plastic latch formed opposite each catch.

26. The system of claim 25 wherein the latches and the catches on the backside of at least one panel extend at approximately a 45 degree angle from the backside of the panel.

27. The system of claim 12 wherein the projecting enlarged heads and the catches each extend at approximately a 45 degree angle from the side of the panel they are oriented to.

28. The storage system of claim 15 wherein the projecting enlarged heads and the catches each extend at approximately a 45 degree angle from the side of the panel they are oriented to.

29. The storage system of claim 20 wherein the projecting enlarged heads and the catches each extend at approximately a 45 degree angle from the side of the panel they are oriented to.

30. The storage system of claim 21 wherein the backside facing projecting enlarged heads and catches extend at approximately a 45 degree angle from the side of the panel they are oriented to.

31. The system of claim 1 wherein each catch is constructed of a material with at least one of the following characteristics, elasticity, memory and lubricity to allow the catch to deform upon insertion or removal of the corresponding latch and to substantially snap-back into place after deformation.

32. The system of claim 12 wherein each catch is constructed of a material with at least one of the following characteristics, elasticity memory and lubricity to allow the catch to deform upon insertion or removal of the corresponding latch and to substantially snap-back into place after deformation.

33. The system of claim 12 wherein at least one cornercover and panel are constructed of the same material.

34. The system of claim 12 wherein at least one cornercover and panel are constructed of different material.

35. The system of claim 33 wherein the material to construct at least one of the corner covers and the attached panel is selected from one or more of the group consisting of framed wire mesh, coated wire, plastic grids, wood, metal, plastic, composites, sheet steel, stainless, hot rolled, stainless cold rolled, carbon steel, alloy, brass, or copper stamped, copper formed, woven metal, woven plastic and metal frames inserted molded into plastic.

36. The system of claim 34 wherein the material to construct at least one of the corner cover and the attached panel one each selected from a different one of the group consisting of framed wire mesh, coated wire, plastic grids, wood, metal, plastic, composites, sheet steel, stainless, hot rolled, stainless cold rolled, carbon steel, alloy, brass, or copper stamped, copper formed, woven metal, woven plastic and metal frames inserted molded into plastic.

37. The method of claim 19 the method comprising the snapping in a sixth panel to form a closed box.

38. The system of claim 12 wherein the mounting mechanism of the corner covers is selected from the group consisting of adhesives, locking tabs, sonic welds, glue, rivets, and crimping.

* * * * *